United States Patent
Mehrvar et al.

(10) Patent No.: US 9,658,403 B2
(45) Date of Patent: May 23, 2017

(54) APPARATUS AND METHODS FOR SCALABLE PHOTONIC PACKET ARCHITECTURES USING PIC SWITCHES

(71) Applicant: Huawei Technologies Co., Ltd., Shenzhen (CN)

(72) Inventors: Hamid Mehrvar, Kanata (CA); Huixiao Ma, Shenzhen (CN); Eric Bernier, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 120 days.

(21) Appl. No.: 14/695,970

(22) Filed: Apr. 24, 2015

(65) Prior Publication Data

US 2015/0309265 A1    Oct. 29, 2015

Related U.S. Application Data

(60) Provisional application No. 61/984,571, filed on Apr. 25, 2014.

(51) Int. Cl.
*G02B 6/35* (2006.01)
*H04Q 11/00* (2006.01)

(52) U.S. Cl.
CPC .......... *G02B 6/3546* (2013.01); *G02B 6/3548* (2013.01); *G02B 6/3556* (2013.01);
(Continued)

(58) Field of Classification Search
CPC .. G02B 6/3546; G02B 6/3558; G02B 6/3548; G02B 6/3556; H04Q 11/0005;
(Continued)

(56) References Cited

U.S. PATENT DOCUMENTS

2012/0008943 A1    1/2012 Singla et al.
2013/0044748 A1    2/2013 Shah et al.
(Continued)

FOREIGN PATENT DOCUMENTS

WO    2015164799 A1    10/2015

OTHER PUBLICATIONS

Nakamura et al, Wavelength Selective Switching with One-Chip silicon photonic circuit including 8×8 matrix switch, Optical Society, OSA/OFC/NFOEC, 2011.*
(Continued)

*Primary Examiner* — Leslie Pascal
(74) *Attorney, Agent, or Firm* — Slater Matsil, LLP

(57) ABSTRACT

Embodiments are provided for scalable photonic packet fabric architectures using photonic integrated circuit switches. The architectures use compact size silicon photonic circuits that can be arranged in a combined centralized and distributed manner. In an embodiment, an optical switch structure comprises a plurality of core photonic based switches and a plurality of photonic interface units (PIUs) optically coupled to the core photonic based switches and to a plurality of groups of top-of-rack switches (TORs). Each PIU comprises a N×N silicon photonic (SiP) switch optically coupled to a group of TORs associated with the PIU from the groups of TORs, where N is a number of the TORs in each group. The PIU also comprises a plurality of 1×P SiP switches coupled to the group of TORs associated with the PIU and to the core photonic based switches, where P is a number of the core photonic based switches.

17 Claims, 12 Drawing Sheets

(52) U.S. Cl.
CPC ....... *G02B 6/3558* (2013.01); *H04Q 11/0003* (2013.01); *H04Q 11/0005* (2013.01); *H04Q 2011/005* (2013.01); *H04Q 2011/0024* (2013.01); *H04Q 2011/0039* (2013.01); *H04Q 2011/0045* (2013.01); *H04Q 2011/0054* (2013.01)

(58) Field of Classification Search
CPC ....... H04Q 11/0003; H04Q 2011/0039; H04Q 2011/0045; H04Q 2011/005; H04Q 2011/0024; H04Q 2011/0054
See application file for complete search history.

(56) References Cited

U.S. PATENT DOCUMENTS

| | | |
|---|---|---|
| 2013/0287397 A1 | 10/2013 | Frankel et al. |
| 2013/0308946 A1 | 11/2013 | Gerstel et al. |
| 2014/0068534 A1 | 3/2014 | Lee et al. |
| 2015/0309265 A1 | 10/2015 | Mehrvar et al. |

OTHER PUBLICATIONS

Notification of Transmittal of the International Search Report and the Written Opinion of the International Searching Authority, or the Declaration received in Application No. PCT/US2015/027613, mailed Jul. 23, 2015, 9 pages.

* cited by examiner

APPARATUS AND METHODS FOR SCALABLE PHOTONIC PACKET ARCHITECTURES USING PIC SWITCHES

This application claims the benefit of U.S. Provisional Application No. 61/984,571 filed on Apr. 25, 2014 by Hamid Mehrvar et al. and entitled "Scalable Photonic Packet Fabric Architecture and Method Using Small PIC Switches," which is hereby incorporated herein by reference as if reproduced in its entirety.

TECHNICAL FIELD

The present invention relates to optical communications, and, in particular embodiments, to apparatus and methods for scalable photonic packet architecture using photonic integrated circuit (PIC) switches.

BACKGROUND

Increased datacenter traffic is stretching the upper bound capability of electronic packet switching. Photonic switching is a potential solution. However, standalone photonic switches are typically relatively small in size. On the other hand, practical core switches may require design for tens of terabits (Tb) throughput. Photonic core switches should match this capacity if they are to be deployed. Currently, the switches that can be built in silicon photonic circuits are 4×4 and 8×8. This may not be enough capacity given that with an interface rate of 100 Gbps (Gigabits per second) the throughput is 0.8 Tbps (Terabits per second). Core switch capacity should scale to tens of terabit for such capacity deployment. As a result, silicon photonic switches should scale to 50 Tbps or higher to be comparable to their electrical counterpart. There is a need for improved scalable photonic packet architectures with photonic integrated circuit (PIC) switches to meet such requirements.

SUMMARY OF THE INVENTION

In accordance with an embodiment, an optical switch for switching optical packets comprises a N×N silicon photonic (SiP) switch providing connections between N-to-N interfaces, wherein N is an integer, and a plurality of 1×P SiP switches providing connections between 1-to-P interfaces, wherein P is an integer. The N×N SiP switch connects each of N top of rack switches (TORs) to each other, and wherein each 1×P SiP switch connects P core photonic based switches to the N TORs. Each core photonic based switch is connected to G similar optical switches including the optical switch, where G is an integer.

In accordance with another embodiment, an optical switch for switching optical packets comprises a N×N silicon photonic (SiP) switch providing connections between N-to-N interfaces, wherein N is an integer, and a N×P SiP switch providing connections between N-to-P interfaces, wherein P is an integer. The N×N SiP switch connects each of N top of TORs to each other, and the N×P SiP switch connects P core photonic based switches to the N TORs. Each of the N TORs is connected through M interfaces to M N×P SiP switches, where M is an integer.

In accordance with another embodiment, an optical switch for switching optical packets comprises a N×N silicon photonic (SiP) switch providing connections between N-to-N interfaces, wherein N is an integer, and N M×P SiP switches each providing connections between M-to-P interface, wherein P and M are integers. The N×N SiP switch connects each of N TORs to each other, and the N M×P SiP switches connect P core photonic based switches to the N TORs.

In accordance with yet another embodiment, a method of operating an optical switch structure with PIC switches includes receiving, at PIU from a TOR, an optical packet, and determining whether the optical packet has a destination TOR directly coupled to the PIU. The method further includes performing one of sending, through a N×N silicon photonic (SiP) switch of the PIU, the optical packet to the destination TOR upon determining the destination TOR is directly coupled to the PIU. The optical packet is then sent, through a 1×P SiP switch of the PIU, to a core photonic based switch coupled to the destination TOR upon determining the destination TOR is directly coupled to the PIU. The values N and P are integers.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are provided herein for switches using scalable photonic packet fabric architectures using photonic integrated circuit (PIC) switches. The architectures use compact size silicon photonic circuits or chips that can be arranged in a combined centralized and distributed manner. The architectures comprise photonic interface units (PIUs) including silicon photonic (SiP) switches that provide intra-connectivity of top-of-rack switches, also referred to as top-of-racks (TORs), and further including photonic switch interfaces between the TORs and core SiP switches. The inter-connectivity of the PIUs can be achieved by a core SiP switch in the various embodiments. In an embodiment, the core SIP comprises a plurality of high-speed SiP circular busses, also referred to as rings, arranged as described below. In another embodiment, the core SiP switch is a plurality of $G_N \times G_N$ SiP switches connected to all N×G TORs through PIUs. Embodiments also include control architectures for achieving scalable data centers using SiPs, for both synchronous and asynchronous operations. The architectures is rate agnostic, that is operates consistently independent on the data rate, and can support any interface rates such as 100 Gbps (Gigabit per second) or higher.

Figure 1A:
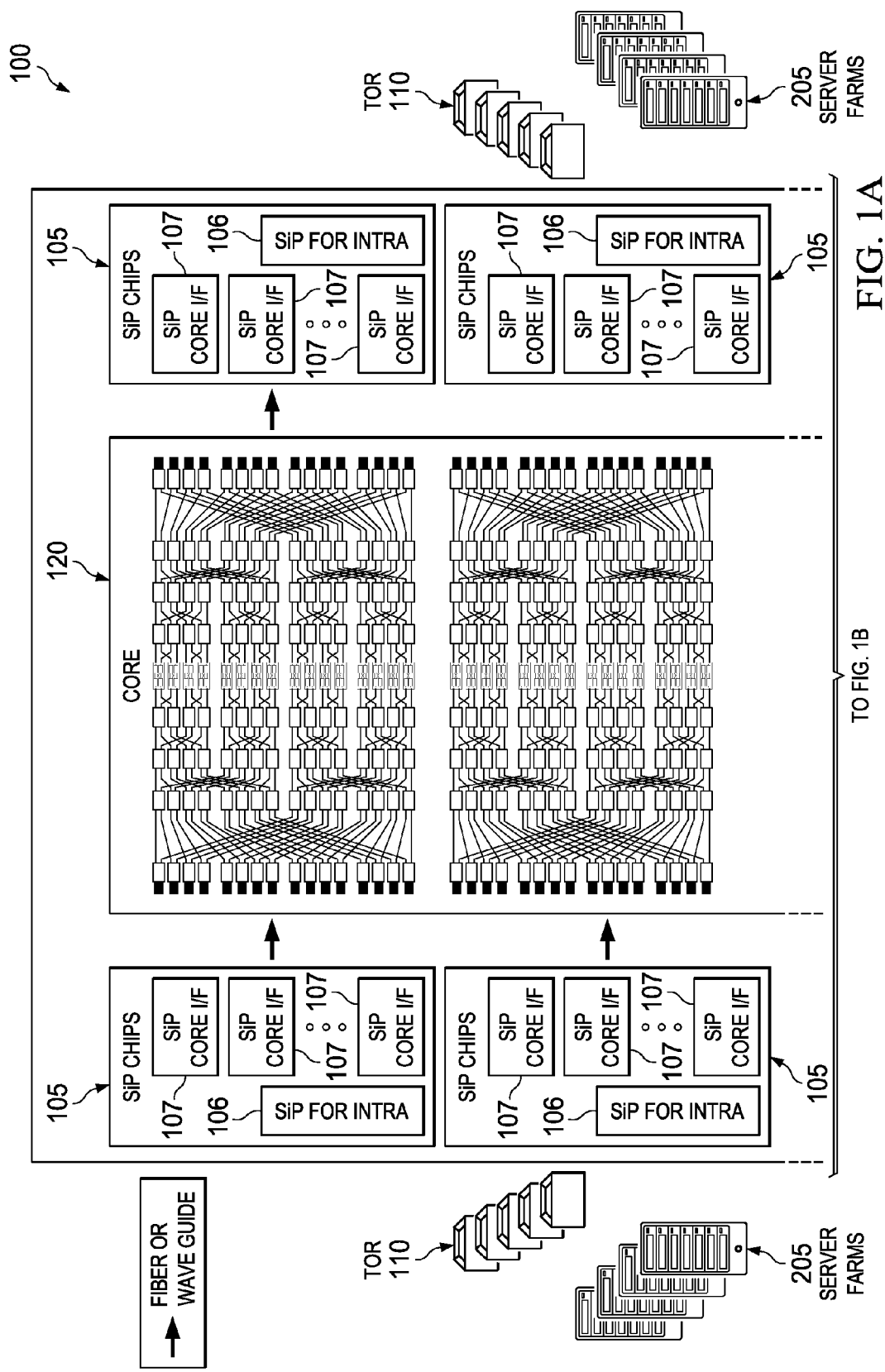
FIGS. 1A and 1B shows an embodiment of a photonic packet fabric architecture using PIC switches.
Figure 1B:
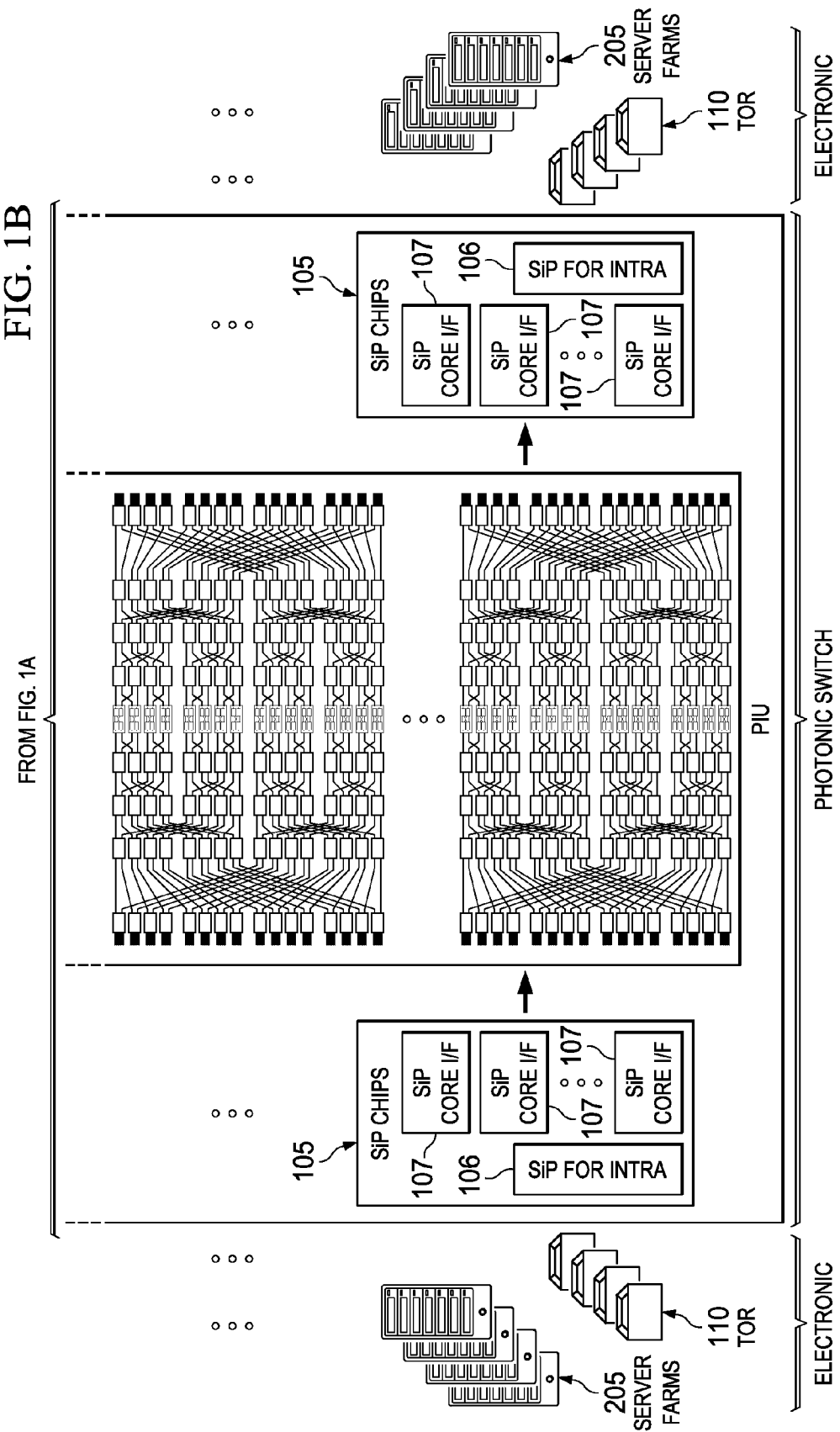

FIGS. 1A and 1B shows an architecture of a photonic packet fabric architecture 100 using PIC switches according to an embodiment. The fabric architecture 100 comprises a core photonic switch 120 coupled to a plurality of PIUs 105. Each PIU 105 can be coupled to a group of TORs 110, also referred to herein as super TORs. The TORs 110 are also coupled to a plurality of data servers or server farms. The core photonic switch 120 is a SiP fabric that can be based on various suitable architectures in various embodiments. For instance, the core photonic switch 120 can comprise one or more paired high-speed circular busses (rings) interconnecting the PIUs 105. Alternatively, the core photonic switch 120 is a fabric of $G_N \times G_N$ small SIP switches that interconnect the PIUs 105. The PIUs 105 interconnect the TORs 110 through the core photonic fabric 120. A PIU 105 also intra-connects the group of TORs 110 (super TOR) that is directly coupled to that PIU 105. A PIU 105 comprises a SIP switch 106 coupled to a group of TORs 110 and providing the intra-connectivity to that group of TORs 110. The PIU 105 also comprises photonic switches 107 providing the interface between the TORs 110 and the core photonic switch 120. The fabric architecture 100 can be scaled to handle as many TORs (and servers) as needed with proper selection of the number and design of the photonic elements above.

Figure 2:
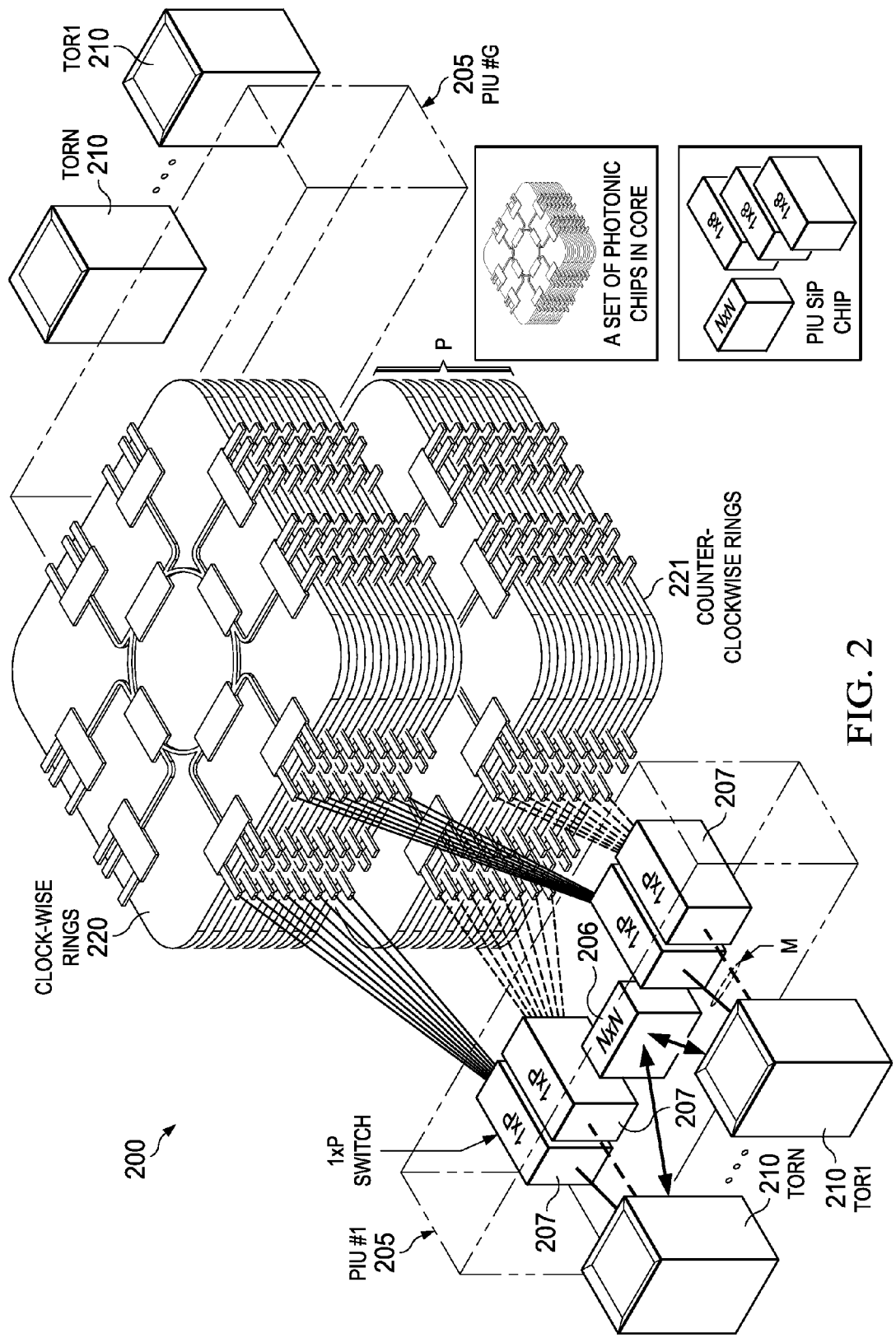
FIG. 2 shows another embodiment of a photonic packet fabric architecture with circular busses or rings.

For an understanding of one of a number of possible uses of FIG. 2, which will be described in fuller detail below, a description of the connection of a number of data centers into a multisite data center will now be presented. At a first data center, a series of servers are connected to a Top Of Rack (TOR) switch. These TORs are largely co-located and can be considered to be co-located. For the purposes of this discussion, at the first data center there will be N TORs. The switching system will connect G different data centers (each of which can have a different number of TORs). To connect to the switching system, a PIU provides a connection to each of the N TORs. Each of the N TORs have M interfaces. The PIU will have the capacity to provide a switching function connecting the M TOR interfaces to a core switch fabric. In the example of FIG. 2, the core switch fabric has P layers, thus requiring an M×P switching function which can be implemented using M 1×P switches. The M×P switch function provides connectivity to a core switch that allows connectivity to other PIUs connecting other data centers (also referred to below as Super TORs). The PIU can also provide an N×N switching function that allows packets from one TOR to be routed to another TOR at the same site. The core switching functionality allows for the connection of G super TORs through G PIUs. As illustrated in FIG. 2, this can be provided through the use of a plurality of rings connecting each of the G data centers. The use of two different directions of switching rings can be one possible implementation as will be described below.

FIG. 2 shows an embodiment of a photonic packet fabric architecture 200 using PIC switches. In this architecture, the core photonic switch of the fabric architecture 200 comprises a plurality of clockwise ring switch fabrics 220 and a plurality of counter-clockwise ring switch fabrics 221. The two ring switch fabrics are coupled through G PIUs 205 (G is an integer) to G corresponding groups of super TORs 210. Each group of super TORs 210 includes N super TORs (N is an integer) connected to one corresponding PIU 205. Each super TOR 210 (in the group of N super TORs) is a group of individual TORs that can be connected to data servers. Specifically, each PIU 205 comprises N×N SiP chip 206 that intra-connects each of the N super TORs 210 corresponding to that PIU 205. The N×N SiP chip 206 optically connects each one of the super TORs 210 to each of the other super TORs 210 in the same group of N TORs 210, thus providing N×N optical connections. The PIU 205 also comprises a plurality of 1×P SiP switches 207 that optically connect the N super TORs 210 to the two ring switch fabrics. Each super TOR 210 in the group of N super TORs 210 has M interfaces and each interface uses one 1×P SiP switches 207 (M is an integer) to a plurality of clockwise ring switch fabrics 220 and counter-clockwise ring switch fabrics 221. Each 1×P SiP switch 207 connects a super TOR 210 to P ring switch fabrics 220 or P ring switch fabrics 221.

Each of the clockwise ring switch fabrics 220 may be paired to a corresponding counter-clockwise ring switch fabric 221. As such, each clockwise ring switch fabric 220 and its paired counter-clockwise ring switch fabric 221 are connected to a super TOR 210 through respective 1×P SiP switches 207 in each PIU 205. Each clockwise ring switch fabric 220 comprises G ports (also referred to herein as nodes) connected to G corresponding PIUs 205, and distributed on a circular photonic path (waveguide or fiber) that circulates data between the ports or nodes in a clockwise direction. Each counter-clockwise ring switch fabric 221 also comprises G ports connected to the G corresponding PIUs 205. The ports of the counter-clockwise ring switch fabric 221 are distributed on a circular photonic path that circulates data between the ports in a counter-clockwise direction. The sets of ring switch fabrics 220 and 221 each include P similar ring switch fabrics described below.

The design and implementation complexity of the fabric architecture 200 determines a suitable or optimum choice for N and M. With M TOR interfaces, M×P ring switch fabrics are used. The ring switch fabrics thus include (M×P)/2 clockwise ring switch fabrics 220 and (M×P)/2 counter-clockwise ring switch fabrics 221. As such, the fabric capacity is 2×(M×P×G)=102 Tb per second (Tb/s), for N=8, M=8, P=8, and G=8, where each of the M interfaces operates at 100 Gbps. The input/output (I/O) capacity is 2×(M interface per TOR)×(N TOR per PIU)×(G PIU)×100 Gbps per interface=M×N×G×100 G=102 Tb/s. Increasing the number P allows more switching capacity than interface capacity, which helps to handle contention by using different switch core for the contended connections. For silicon photonic implementation, each ring has G 2×2 switching elements (cells). An embodiment example of such switching cell is Mach-Zehnder Interferometer. To isolate crosstalk on the ring each 2×2 switch cell of the ring can be implemented as a cascade of 1×2 and 2×1 switching cells. The maximum total number of switching elements (cells) that a connection sees from one super TOR to another super TOR is calculated as log P+log N+2*(G/2)+log N+log P=20 switching cells assuming a maximum traversal of half a ring. Assuming each switch cell has an insertion loss of 0.6 dB, the switch insertion loss is 20×0.6=12 dB. The coupling loss is obtained as 2.5 db (fiber in)+2.5 dB (fiber out)=5 dB. The link loss is calculated as switch insertion+5 dB coupling loss=17 dB. The laser to receiver loss is obtained as the sum of patch cord losses at 3 dB and the link loss, which is 20 dB.

In another embodiment, the PIUs 205 comprise a M×P switch instead of the M 1×P switches 207. In this case, the M×P switch connects the M interfaces of a super TOR to P switches. The total number of M×P switches in a PIU is N.

In another embodiment, the PIUs 205 comprise N×P switches instead of the 1×P switches 207. In this case, M N×P SiP switches are needed if the super TOR has M interfaces, where each N×P SiP switch connects to one of the M interfaces across all TORs.

Figure 3:
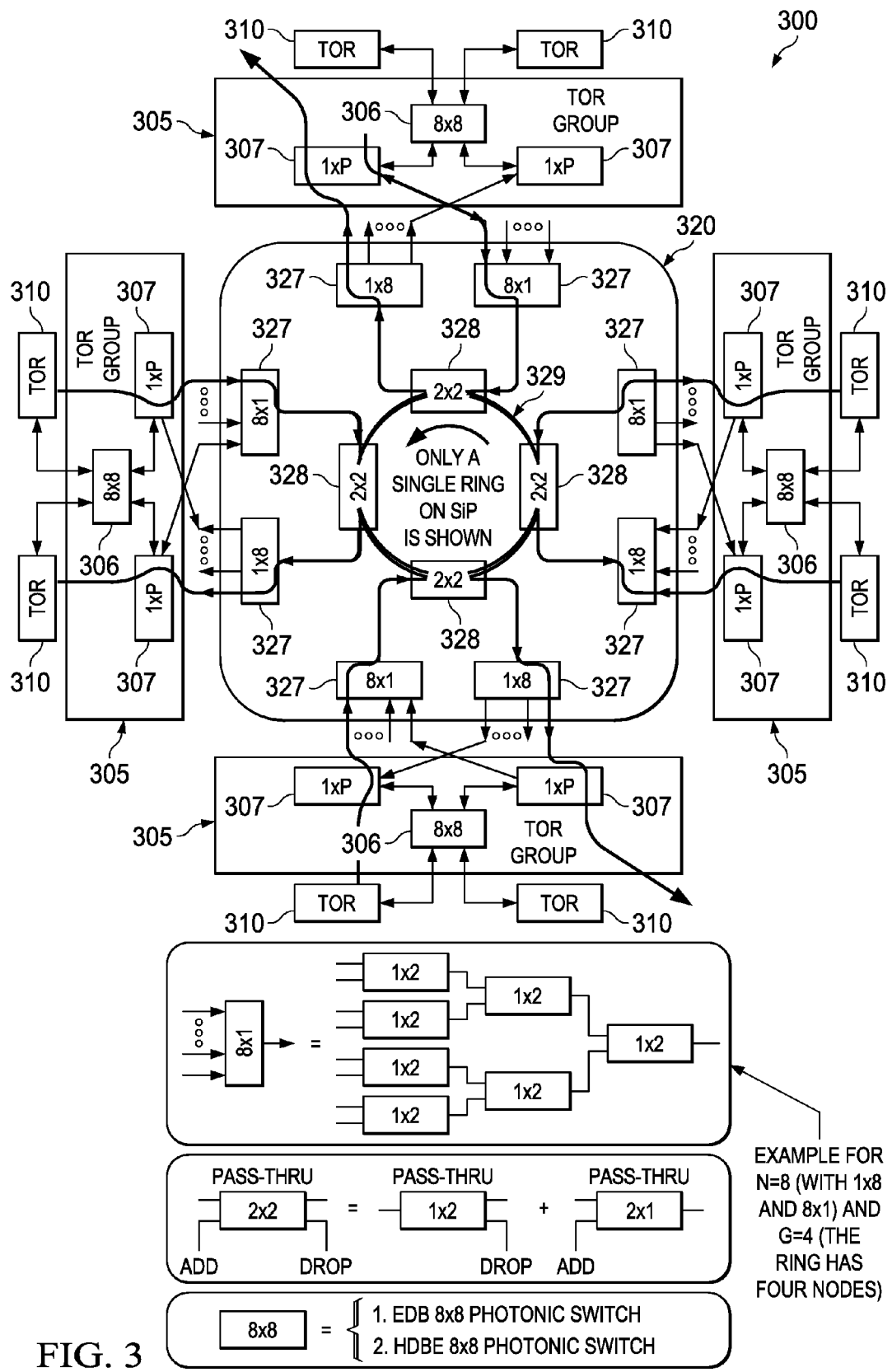
FIG. 3 shows another embodiment of a photonic packet fabric architecture using a ring switch.

FIG. 3 shows another embodiment of a photonic packet fabric architecture 300 using a ring switch. The figure shows the connectivity between G PIUs 305 and a ring switch fabric 320 on SiP. The fabric architecture 300 may comprise a plurality of similar ring switch fabrics connected to the G PIUs 305. Each PIU 305 is connected to a plurality of corresponding TORs 310. In this example, each PIU 305 intra-connects 8 TORs 310 to each other through a 8×8 SiP chip 306 in the PIU 305. Each PIU 305 is also connected to a pair of ports or nodes 327 through a plurality of 1×P SiP switches 307 in the PIU 305. Each 1×P SiP switch 307 is connected to one node 327 as input and another node 327 as output. The input/output pair of nodes 327 are connected to a pair of circular optical paths 329 through a corresponding 2×2 switch 328 in the ring switch fabric 320. The pair of circular optical paths 329 can be a fiber or a waveguide on a chip. The pair of circular optical paths 329 is cross connected to a plurality of pairs of nodes 327 through corresponding 2×2 switches 328. The nodes 327 can share the pair of circular optical paths 329 for concurrent communications and the optical signals are transferred through the paths in one direction (clockwise or counter-clockwise). The plurality of pairs of nodes 327 are connected to respective groups of TOR 310. In an example, for G=10 and N=8, the ring switch fabric 320 includes 10 pairs of nodes 327, which correspond to a 1×8 switch and a 8×1 switch representing 10 PIUs 305 around the switch fabric. The PIU 305 includes a number of 1×P SiP switches 307. The number of 1×P switches 307 is M×N, where N is the number of super TORs and M is the number of interfaces on each super TOR. As shown, the 8×1 chip (in the pair of nodes 327) can be a cascade of three levels of 1×2 SiP chips. The 2×2 chip 328 can be a pair of 1×2 and 2×1 SiP chips. The 8×8 SiP chip 306 can be arranged in low crosstalk switch architecture such as route and select architecture, its equivalent Dilated Banyan architecture or its enhanced version, e.g., Enhanced Dilated Banyan (EDB). Other alternatives include the use of Dilated Benes or Hybrid Dilated Benes with EDB (HDBE). In other embodiments, the switches above can be any photonic circuits or chips with suitable design.

Figure 4:
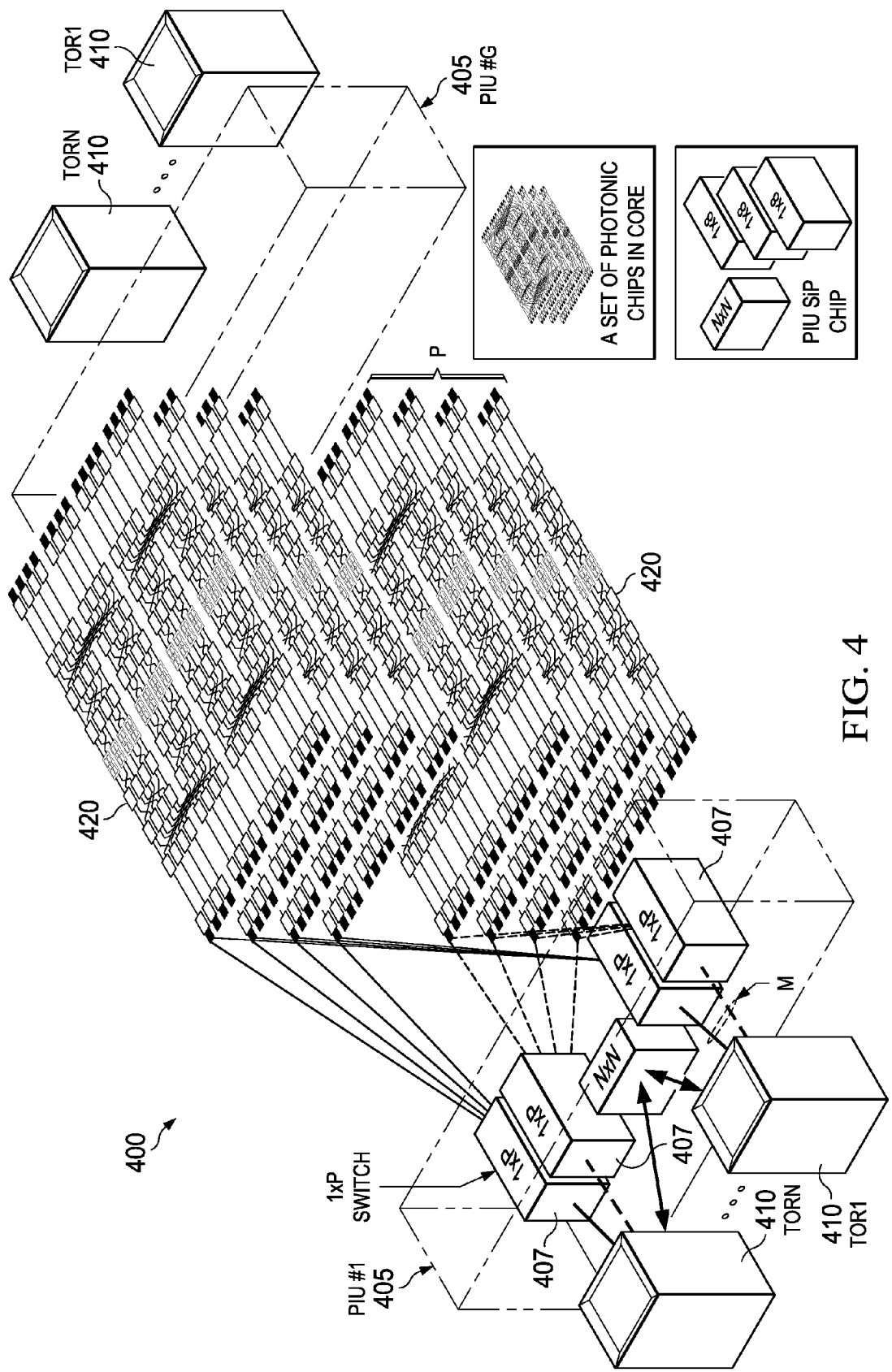
FIG. 4 shows another embodiment of a photonic packet fabric architecture using N×N Silicon Photonics switches.

FIG. 4 shows another embodiment of a photonic packet fabric architecture 400 using $G_N \times_N$ SiP switches. In this architecture, the core photonic switch of the fabric architecture 400 comprises a number of set of core $G_N \times G_N$ switch fabrics 420. These sets are coupled through G PIUs 405 (G is an integer) to G corresponding groups of super TORs 410. Each group of super TORs 410 includes N super TORs (N is an integer) connected to one corresponding PIU 405. Each super TOR 410 (in the group of N super TORs) is a group of individual TORs that can be connected to data servers. Each PIU 405 comprises a PIU N×N SiP chip 407 that intra-connects each of the N super TORs 410 corresponding to that PIU 405. The PIU N×N SiP chip 406 optically connects each one of the super TORs 410 to each of the other super TORs 410 in the same group of N TORs 410, thus providing N×N optical connections. The PIU 405 also comprises a plurality of 1×P switches 407 that optically connect the N super TORs 410 to a plurality of sets of core $G_N \times_N$ switch fabrics 420. Each super TOR 410 in the group of N super TORs 410 is connected through M 1×P switches 407 (M is an integer) to a plurality of core $G_N \times_N$ switch fabrics 420. Each 1×P switch 407 connects a super TOR 410 to P core $G_N \times G_N$ switch fabrics 420. In another embodiment, a PIU can use a plurality of M×P SiP chip can be used instead of the PIU 1×P switches 407 to achieve similar connections.

The design and implementation complexity of the fabric architecture 400 determines a suitable or optimum choice for N and M. With M TOR interfaces, M×P core $G_N \times G_N$ switch fabrics are used. Each core $G_N \times G_N$ switch fabric is inherently G×G that has N×G inputs and N×G outputs. Such connectivity results in full connectivity of G PIUs 405 with G connections at a time through a $G_N \times G_N$ switch. The core $G_N \times G_N$ switch fabrics thus include sets of M×P core $G_N \times G_N$ switch fabrics 420. As such, the fabric capacity is 2×(M×P×Switch Capacity)=2×M×P×0.8 Tb/s=102 Tb/s, for N=8, M=8, P=8, and G=8 with 100 Gbps rate. The I/O capacity is (M interface per TOR)×(N TOR per PIU)×(G PIU)×100 Gbps I/O=M×N×G×100 G=102 Tb/s. Increasing the number P allows contention handling as switch capacity is greater than I/O capacity. Using Hybrid Dilated Banyan with EDB (HDBE) as G×G switch with 2 log G+2 switching cells, the total number of switching cells that a signal passes through from an input to an output is calculated as log P+log N+(2 log G+2)+log N+log P=20 cells. The switch insertion loss is thus 20×0.6=12 dB. The coupling loss is obtained as 2.5 db (fiber in)+2.5 dB (fiber out)=5 dB. The laser to receiver loss is obtained as the sum of patch cord losses at 3 dB and the link loss, which is 20 dB.

In another embodiment, the quantity of elements can be set to N=16, P=16, G=16, and M=16 or to N=32, P=32, G=16, and M=4. As such, the fabric capacity is 2×(M×P×Switch Capacity)=2×(8×16×(16×100 G))=408 Tb/s. The I/O capacity is 2×(M interface per TOR)×(N TOR per PIU)×(G PIU)×100 Gbps I/O=2×(M×N×G×100 G)=408 Tb/s. The total cells/path is calculated as log P+log N+(2 log G+2)+log N+log P=26 cells. The switch insertion loss is thus 26×0.6=15.6 dB. The coupling loss is obtained as 2.5 db (fiber in)+2.5 dB (fiber out)=5 dB. The laser to receiver loss is obtained as the sum of patch cord losses at 3 dB and the link loss, which is 23.6 dB.

Figure 5:
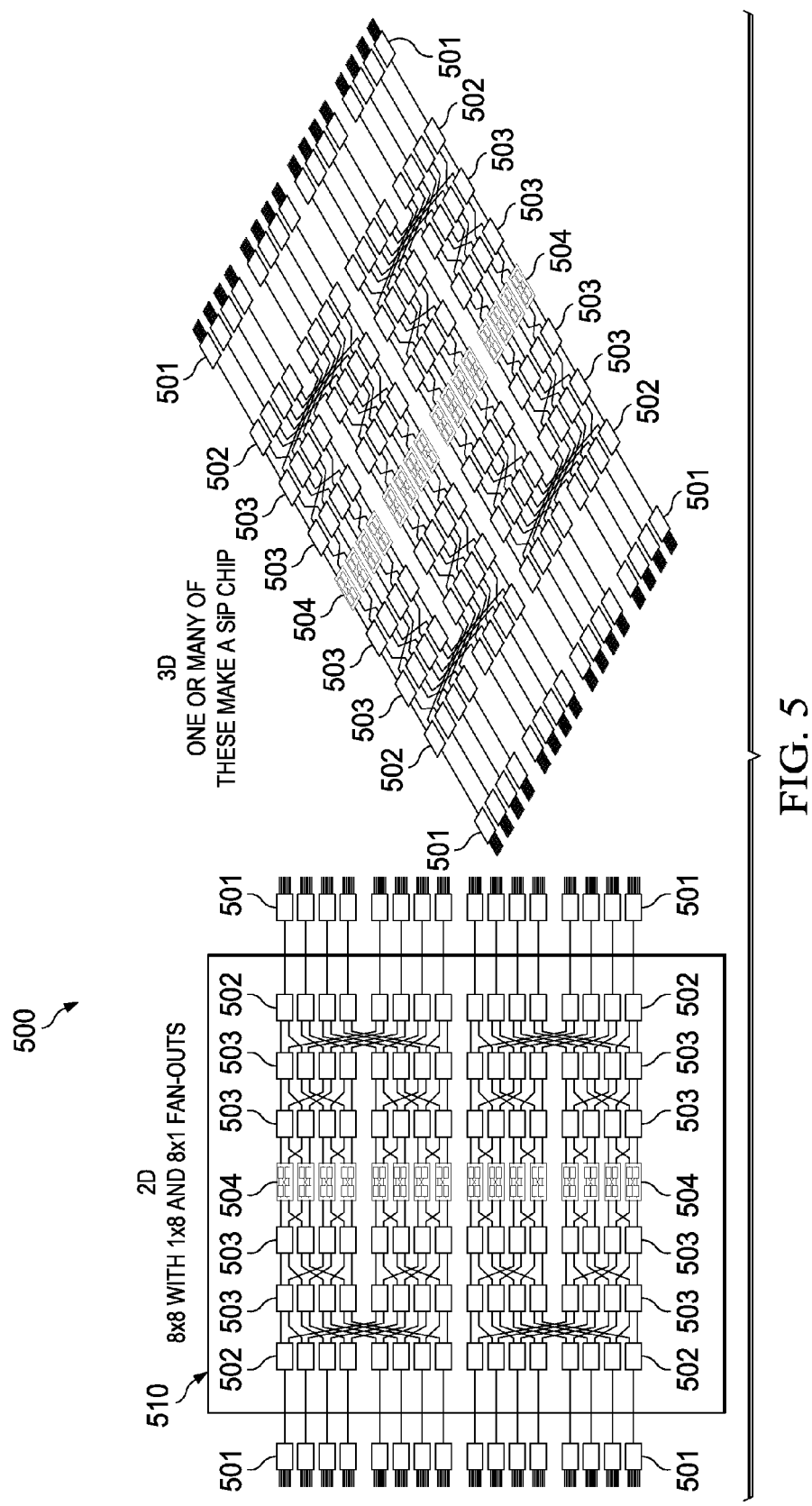
FIG. 5 shows an embodiment of a $G_N \times G_N$ switch fabric that can be connected to G×N TOR.

FIG. 5 shows an embodiment of a $G_N \times G_N$ switch fabric 500 that can be used in the embodiment above of photonic packet fabrics. For instance, a plurality of P $G_N \times G_N$ switch fabrics 500 can form a core switch fabric 420. The $G_N \times G_N$ switch fabric 500 is a G×G switch 510 with G×N inputs and G×N outputs. Each of the G inputs is connected to N TORs through a N×1 (fan-in) switch, and each of the G outputs is connected to the N TORs through a 1×N (fan-out) switch. An embodiment example of architecture for G×G switch 510 is the Hybrid Dilated Benes with EDB (HDBE), where the EDB stage is the 2×2 enhanced dilated banyan (EDB) with crosstalk suppression. For N=8 and G=8, for instance, on the left side, the fabric 500 comprises an edge column of 8×1 SiP cells 501, which are coupled to corresponding 1×2 SiP cells 502. Each of the 1×2 SiP cells 502 are also coupled to a second column of 2×2 SiP cells 503. The second column of 2×2 SiP cells 503 is coupled to a middle column of enhanced 2×2 SiP cells 504. The enhance 2×2 SiP cells 503 are arranged in an EDB configuration that suppresses crosstalk between the two paths in 2×2 SiP cells 504. The remaining columns on the right side of the fabric 500 comprise similar chips that mirror the chips to the left side (arranged in the opposite order and orientation).

The embodiments above provide buffer-less space switches implemented using silicon photonic technology. The embodiment fabrics use compact or small SiP chips without relying upon arrayed waveguide gratings (AWGs) and optical-to-electrical-to-optical (OEO) conversion. As such, the architectures presented herein are expected to have lower power consumption, and smaller footprint and weight in comparison to other switch fabric architectures. For example, the chips can be arranged and organized vertically and/or horizontally in a photonic switch card. The PIUs and core switch fabrics can be connected through photonic waveguides or fibers in various implementations, for instance on a single card or chip or on multiple interconnected cards or chips. Further, the architectures herein can be scalable up to multi Petabits/s using the small SiP chips, for instance by a stack of a large number of chips in the design. Higher rates of 100 G, 200 G, 400 G, can be achieved in comparison to electronic domain Serializer/Deserializer (SerDes) devices with rates of 28 G and 56 G rates.

Figure 6:
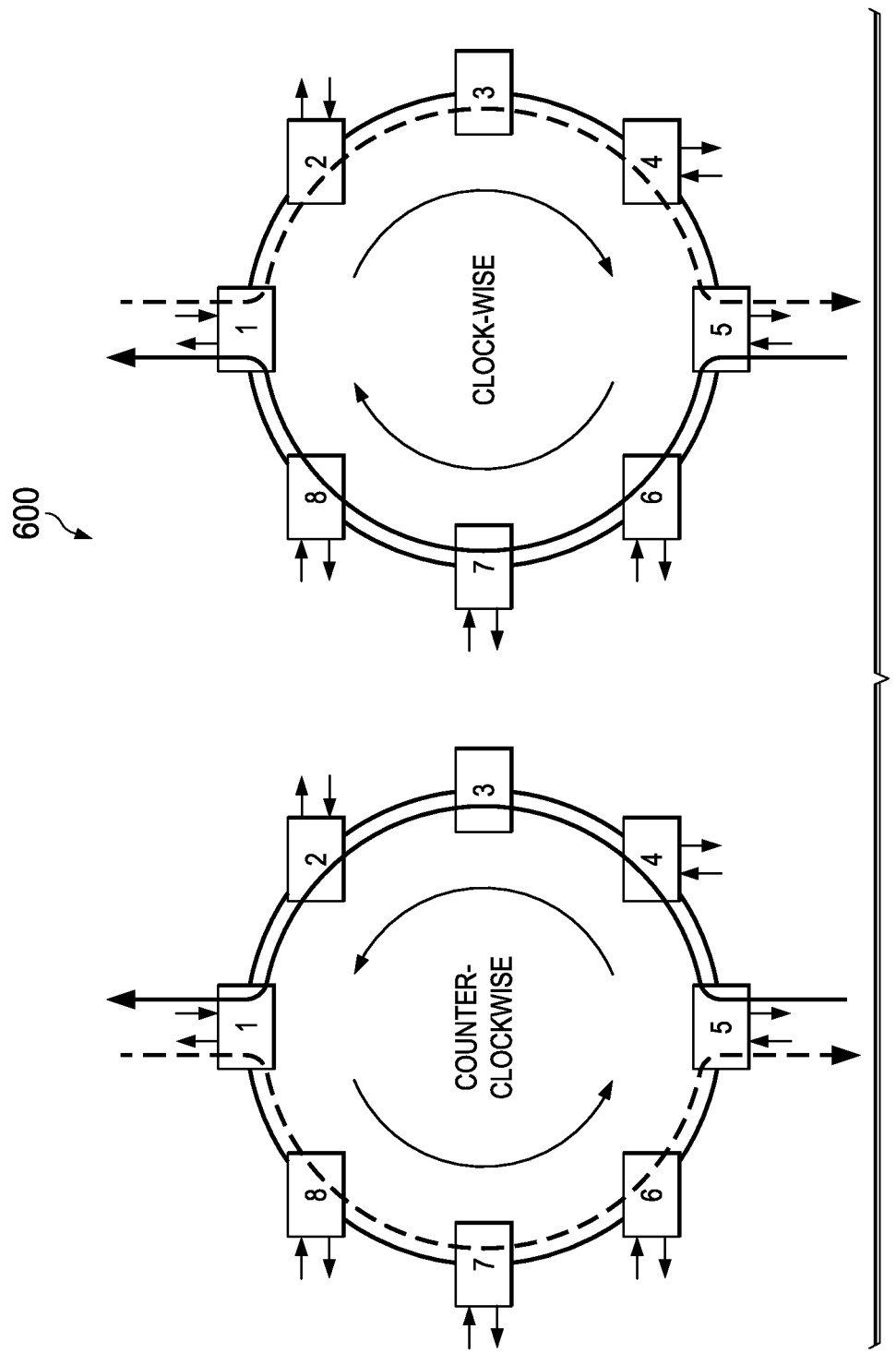
FIG. 6 illustrates a maximum traversal distance in a ring switch fabric.

FIG. 6 illustrates a maximum traversal distance in a ring switch fabric, such as the clockwise ring switch fabric 220 and the counter-clockwise ring switch fabric 221. Assuming N nodes in the ring switch fabric, the maximum nodes traversed in one instance of switching is N/2−1=3, as there are two sets of paired rings (clockwise and counter-clockwise). For example, traffic of node 1 to 6, 7 or 8 uses the counter-clockwise ring, and traffic of node 1 to 2, 3, 4 or 5 uses the clockwise ring. The use of many clockwise and many counter-clockwise rings (P>=4) allows maximum spatial reuse with the help of a suitable algorithm and by connecting the PIU to other nodes so that the traversal distance becomes N/4−1=1. Thus, the throughput becomes equal to capacity.

Figure 7:
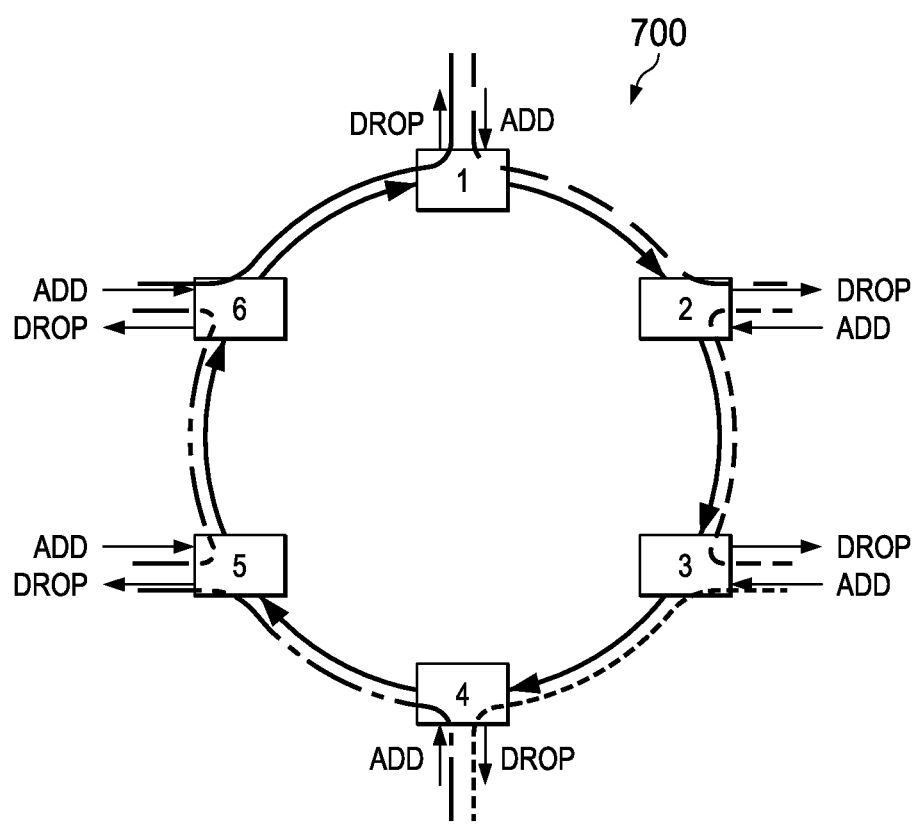
FIG. 7 illustrates spatial reuse in a ring switch fabric.

FIG. 7 illustrates spatial reuse in a ring photonic switch fabric. There is one interface for the switch but any or all 6 nodes can send to other nodes simultaneously. For example, node 1 sends to node 2, node 2 sends to node 3, node 3 sends to node 4, node 4 sends to node 5, and node 6 sends to node 1. A ring assignment algorithm to decide which ring is used for sending data from a source TOR to a destination TOR in order to maximize throughput by using spatial reuse. The ring assignment algorithm takes into consideration two primary factors: fairness and throughput maximization. The ring assignment algorithm can be part of the scheduling scheme of the switch controller to optimally select a better path from a source TOR to a destination TOR.

Figure 8:
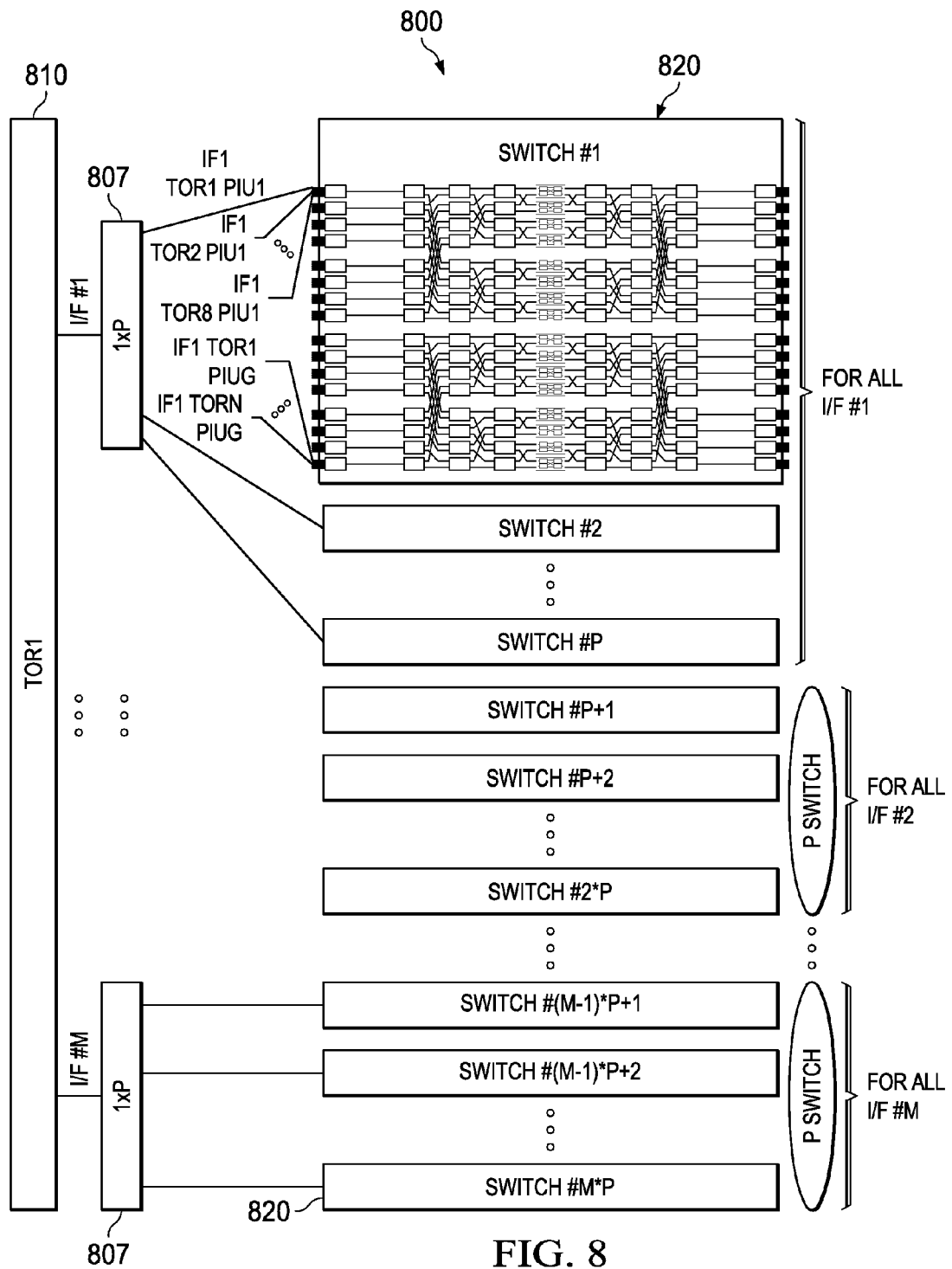
FIG. 8 shows an embodiment of building blocks for a photonic packet fabric architecture using M×P PIC switches.

FIG. 8 illustrates an embodiment of building blocks for a photonic packet fabric architecture using PIC switches. Each TOR or super TOR 810 (collection of TORs) has M interfaces (through a 1×P switch 807 of a PIU) to a core photonic switch fabric 820. For M=N=P=G=8 (where N is the number of TORs per PIU, M is the number of interfaces per TOR, G is the size of the switch, and P is the number of PIUs), the capacity per PIU is N×M×100 G=6.4 Tb. For 8 PIUs, the capacity becomes 8×6.4=51.2 Tb. The throughput with M×P=64 switch planes is 64×0.8 Tb=51.2 Tb.

Figure 9:
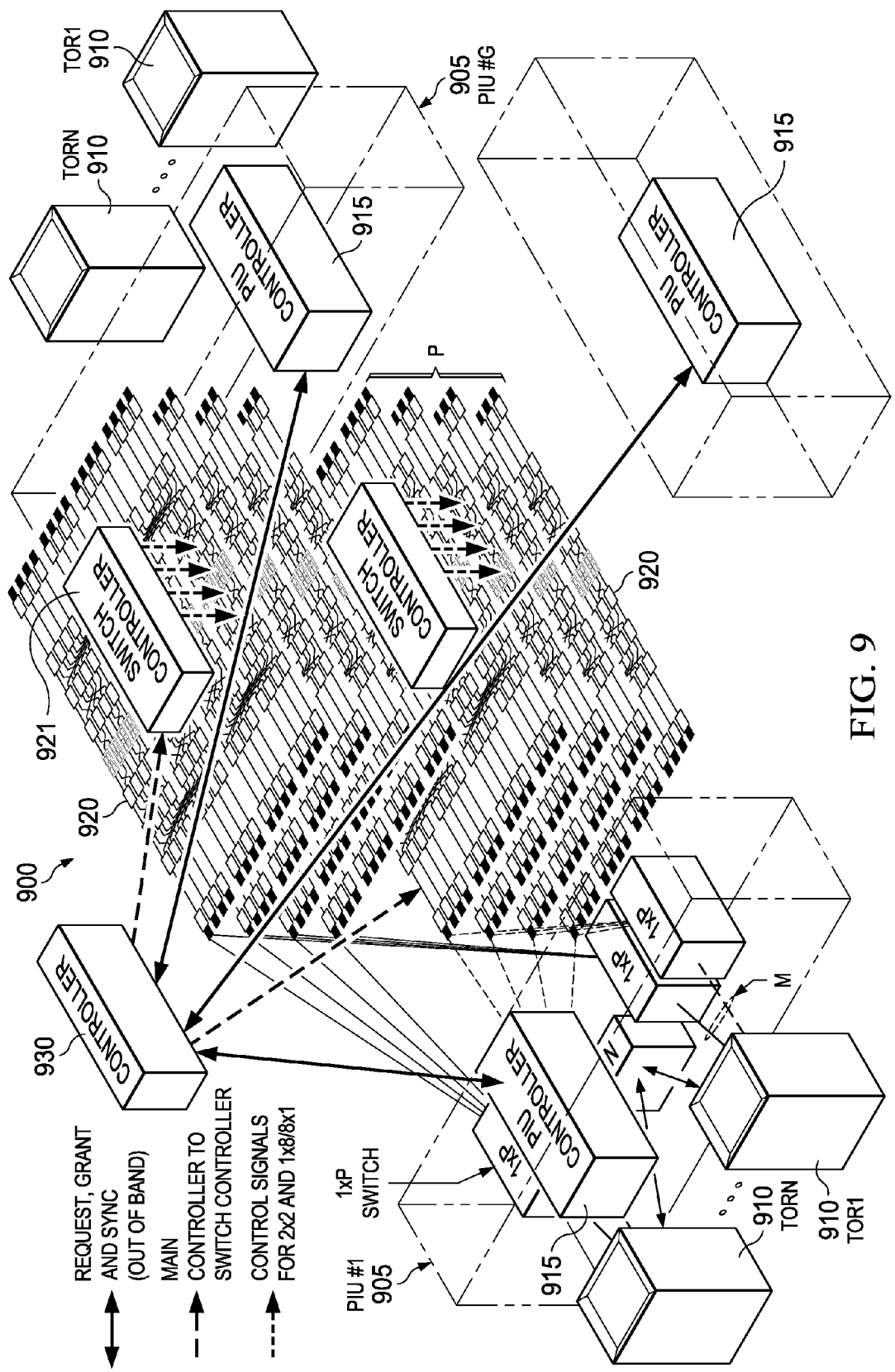
FIG. 9 shows an embodiment of a centralized control architecture for a photonic packet fabric architecture using PIC switches.

FIG. 9 illustrates an embodiment of a centralized control architecture 900 for a photonic packet fabric architecture using PIC switches. In the architecture 900, a TOR 910 (or super TOR) can send data to any TOR 910 using one of the core switch fabrics 920. The core switch fabrics 920 can be N×N switch fabrics (as shown) or ring switch fabrics. A central controller 930 assigns time slots to each TOR 910 on any available switch fabric 920. A packet or a wrapper (that is a collection of many packets) is sent in each time slot. For example, in the case of ring switch fabrics, the time slot assignment can be based on the distance between source and destination to maximize spatial reuse. The central controller 930 can communicate with PIU controllers 915 associated with the PIUs 905, and with switch controllers 921 associated with the core switch fabrics 920. The PIU controllers 915 can communicate requests, grants and synchronization information with the central controller 930, to switch the data from/to the TORs 910. The central controller 930 can also communicate with the switch controllers 921 to determine the switching of the data in the core switch fabrics 920. The communications between the controllers are separate from the switched data paths between the TORs 910. Simpler control can also be achieved by synchronizing all incoming data transmissions. The controllers may be any suitable processing chips (e.g., CPUs) that are connected to their respective switch elements or embedded in the same chip with the switch elements.

The functions of the centralized control architecture 900 comprise two layer controls: a master layer (by the central controller 930) and a local layer (by the PIU controller 915 and the switch controller 921). The centralized controller 930 provides switch synchronization and contention scheduling. The centralized controller 930 sends a synchronization pulse for each time slot, and processes the requests for transmissions from the TORs 910 at the beginning of each time slot. The requests can be out-of-band (at a different frequency band than the data band). A request from each TOR 910 is the destination address of the TOR for the packet (or wrap) at the head of the queue. The centralized controller 930 assigns time slots on various switches for the next time slot, and then sends grants to the TOR (e.g., in the middle of a time slot). Thus, the connection map of the silicon photonic chip switches is configured for the next time slot.

The functions of the PIU controller 915 include making the wrap or photonic frame. The PIU controller 915 decides on intra-group or inter-group connections. In case of inter-group connections, the PIU controller 915 stores the frame using electronics. The PIU controller 915 sends a request out-of-band (out of data frequency band) in the beginning of each time slot, and monitors whether a grant has arrived from the central controller 930 in the middle of the time slot. If there is a grant, the PIU controller 915 removes the frame from the queue and converts the frame into a photonic frame for transmission in the next time slot. If no grant is received, the PIU controller 915 resends the request. In case of intra-group connections, the PIU controller 915 sends the frame to the destination TOR through a local 8×8 SiP switch in the PIU.

Figure 10:
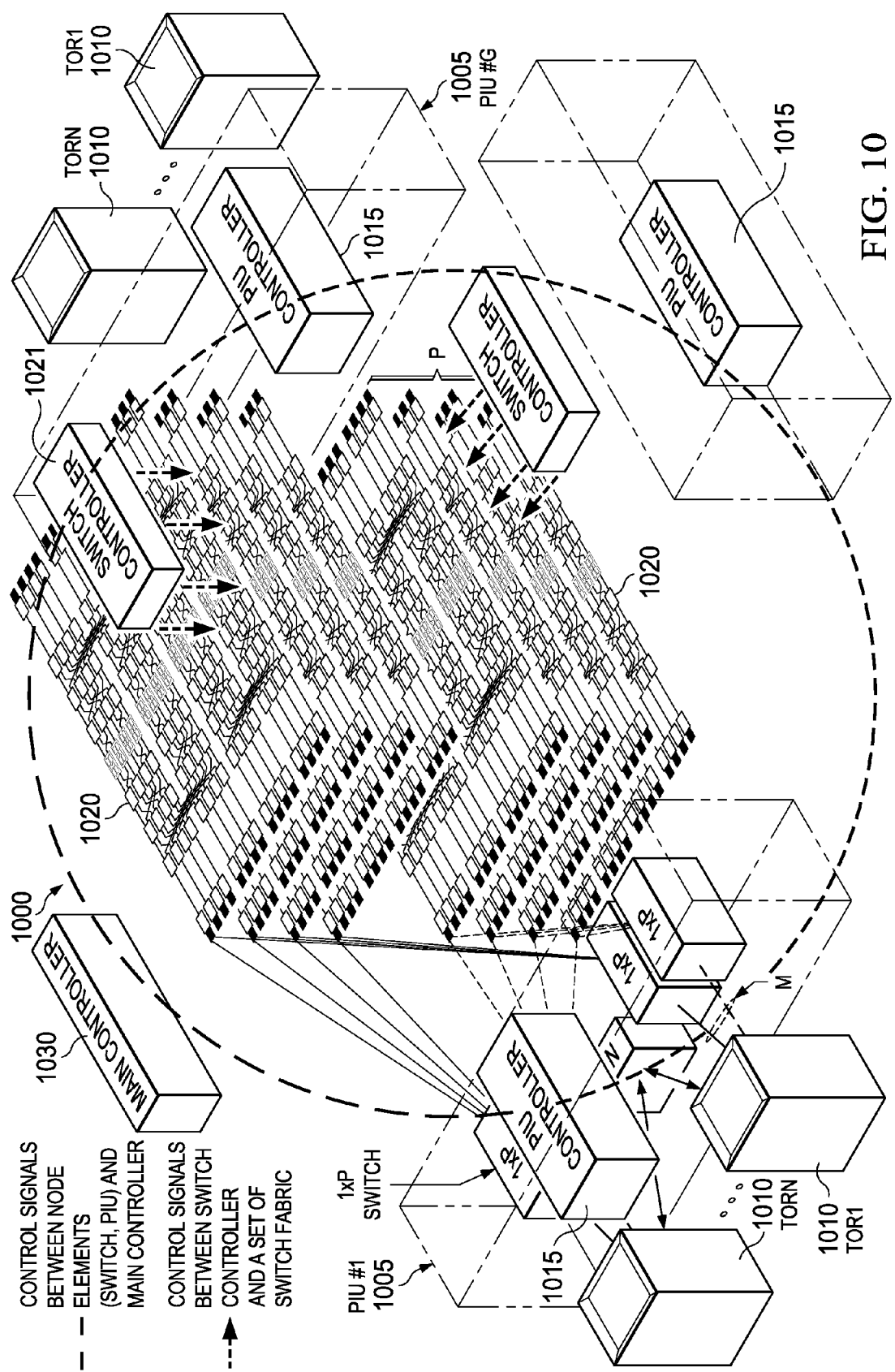
FIG. 10 shows an embodiment of a distributed control architecture for a photonic packet fabric architecture using PIC switches.

FIG. 10 illustrates an embodiment of a distributed control architecture 1000 for a photonic packet fabric architecture using PIC switches. In the architecture 1000, a TOR 1010 (or super TOR) can send data to any TOR 1010 using any of the core switch fabrics 1020. The core switch fabrics can be N×N switch fabrics (as shown) or ring switch fabrics. A main controller 1030 communicates with PIU controllers 1015 associated with the PIUs 1005 and with switch controllers 1021 associated with the core switch fabrics 1020 to cooperatively assign time slots to each TOR 1010 on any available switch fabric 1020. A packet or a wrapper is sent in each time slot. For example, in the case of ring switch fabrics, the time slot assignment can be based on the distance between source and destination to maximize spatial reuse. The various controllers also communicate requests, grants and synchronization information between each other, to switch the data from/to the TORs 1010 and through the core switch fabrics 1020. The function of the main controller 1030 is to coordinate such communications between the other controllers. The PIU controllers 1015 and the switch controllers 1021 make the various switching decisions and requests needed by cooperating among each other through direct communication and/or through the main controller 1030. The controllers may be any suitable processing chips (e.g., CPUs) that are connected to their respective switch elements or embedded in the same chip with the switch elements.

Figure 11:
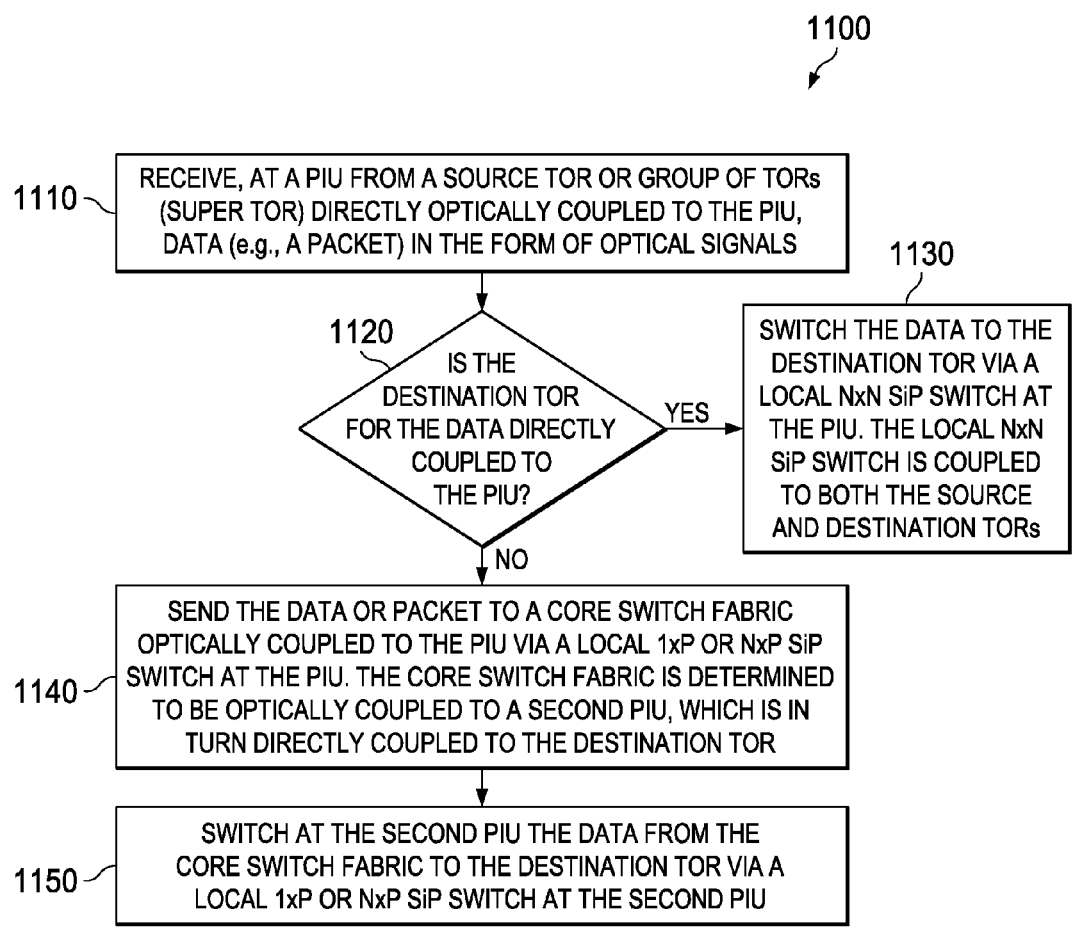
FIG. 11 shows an embodiment of a method of operating a photonic packet fabric using PIC switches.

FIG. 11 shows an embodiment of a method of operating a photonic packet fabric architecture using PICs switches. At step 1110, a PIU receives from a source TOR or group of TORs (super TOR), which is directly optically coupled to the PIU, data (e.g., a packet) in the form of optical signals. At step 1120, a decision is made (e.g., by a controller) whether the data is to be sent to a destination TOR (or super TOR) also directly coupled to the PIU. If the data is intended for a destination TOR directly coupled to the PIOU, then, at step 1130, the data is switched or directed to the destination TOR via a local N×N SiP switch at the PIU. The local N×N SiP switch is coupled to both the source and destination TORs. Alternatively, if the destination TOR is not directly coupled to the PIU, then, at step 1140, the data or packet is sent to a core switch fabric (e.g., a ring switch fabric or a $G_N \times G_N$ switch fabric) optically coupled to the PIU via a local 1×P or N×P SiP switch at the PIU. Specifically, a core switch fabric is selected upon determining the core switch fabric is to be optically coupled to a second PIU, which is in turn directly coupled to the destination TOR. At step 1150, the second PIU switches or directs the data from the selected core switch fabric to the destination TOR via a local 1×P or N×P SiP switch at the second PIU.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical switch for switching optical packets comprising:
    a first photonic interface unit (PIU) comprising:
        a N×N silicon photonic (SiP) switch connecting N top of rack switches (TORs) to each other, wherein each TOR has M interfaces, and wherein N and M are integers; and
        a plurality of 1×P SiP switches, wherein each of the 1×P SiP switches connects a respective interface of the M interfaces of a respective TOR to P core photonic-based switches, and wherein P is an integer.

2. The optical switch of claim 1, wherein the core photonic-based switches comprise N×N SiP switches.

3. The optical switch of claim 1, wherein each core photonic-based switch is connected to G PIUs including the first PIU, where G is an integer.

4. The optical switch of claim 3, wherein the N×N SiP switch and each of the 1×P SiP switches is integrated on a respective chip.

5. The optical switch of claim 3, wherein the plurality of 1×P SiP switches are optically coupled to the P core photonic-based switches through optical fibers.

6. The optical switch of claim 3, wherein the P core photonic-based switches comprise $G_N \times G_N$ SiP switches, wherein each $G_N \times G_N$ switch is a G×G SiP switch with G inputs and G outputs.

7. The optical switch of claim 1, wherein the core photonic-based switches comprise ring based optical switches.

8. The optical switch of claim 7, wherein the ring based optical switches comprise a plurality of pairs of clockwise ring based optical switches and corresponding counter-clockwise ring based optical switches.

9. The optical switch of claim 7, wherein each of the ring based optical switches is connected to G similar optical switches including the optical switch through G nodes and allows an optical packet a maximum traversal distance of G/2-1, where G is an integer.

10. The optical switch of claim 7, wherein a total quantity of the ring based optical switches is determined to increase spatial reuse or allow optical packets a maximum traversal distance of about 1 inside the ring based optical switches.

11. The optical switch of claim 7, wherein each ring based optical switch of the ring based optical switches comprises:
    a plurality of nodes for connecting to a plurality of optical switches including the optical switch, wherein each node comprises a pair of 1×N and N×1 SiP switches coupled to a corresponding optical switch of the optical switches, and a 2×2 SiP switch coupled to the pair of 1×N and N×1 SiP switches; and
    a pair of optical paths arranged in a ring across the nodes and coupled to the pair of 1×N and N×1 SiP switches through the 2×2 SiP switch.

12. The optical switch of claim 11, wherein the pair of optical paths is one of a pair of optical fibers and a pair of optical waveguides.

13. The optical switch of claim 11, wherein each of the 1×N switches and each of the N×1 SiP switches is a cascade of log N levels of 1×2 SiP switches, and wherein the 2×2 SiP switch is a pair of 1×2 and 2×1 SiP switches.

14. A method of operating an optical switch structure with photonic integrated circuit (PIC) switches, the method comprising:
   receiving, at photonic interface unit (PIU) from a top-of-rack switch (TOR), an optical packet;
   determining whether the optical packet has a destination TOR directly coupled to the PIU; and
   performing one of:
      sending, through a N×N silicon photonic (SiP) switch of the PIU, the optical packet to the destination TOR upon determining the destination TOR is directly coupled to the PIU, or
      sending, through a 1×P SiP switch of the PIU, the optical packet to a core photonic-based switch coupled to the destination TOR upon determining the destination TOR is not directly coupled to the PIU, wherein N and P are integers.

15. The method of claim 14 further comprising, after sending the optical packet to the core photonic-based switch:
   sending the optical packet from the core photonic-based switch to a second optical switch coupled to the destination TOR; and
   sending, through a 1×P SiP switch of the second optical switch, the optical packet to the destination TOR.

16. The method of claim 15, wherein sending the optical packet to the core photonic-based switch and sending the optical packet from the core photonic-based switch to the second optical switch comprises sending the optical packet through a ring switch fabric in the core photonic-based switch.

17. The method of claim 15, wherein sending the optical packet to the core photonic-based switch and sending the optical packet from the core photonic-based switch to the second optical switch comprises sending the optical packet through a SiP switch fabric in the core photonic-based switch.

* * * * *